United States Patent [19]

Stöhr

[11] Patent Number: 5,133,685
[45] Date of Patent: Jul. 28, 1992

[54] APPARATUS FOR SEPARATING A CONTINUOUS SAUSAGE SKEIN COMING FROM A STUFFING MACHINE INTO INDIVIDUAL SAUSAGES

[75] Inventor: Jochen Stöhr, Ingerkingen, Fed. Rep. of Germany

[73] Assignee: Albert Handtmann Maschinenfabrik GmbH & Co., KG, Fed. Rep. of Germany

[21] Appl. No.: 721,880

[22] Filed: Jun. 27, 1991

[30] Foreign Application Priority Data

Aug. 28, 1990 [DE] Fed. Rep. of Germany ....... 9012339

[51] Int. Cl.⁵ .............................................. A22C 00/00
[52] U.S. Cl. ........................................ 452/48; 452/46
[58] Field of Search ......................... 452/46, 47, 48, 30

[56] References Cited

U.S. PATENT DOCUMENTS

| | | | |
|---|---|---|---|
| 3,971,101 | 7/1976 | Townsend et al. | 452/48 |
| 4,418,447 | 12/1983 | Ziolko | 452/46 |
| 5,049,108 | 9/1991 | Staudenrausch | 452/48 |

FOREIGN PATENT DOCUMENTS 247829  4/1986  Fed. Rep. of Germany .
1187635  4/1970  United Kingdom .

*Primary Examiner*—Willis Little
*Attorney, Agent, or Firm*—Finnegan, Henderson, Farabow, Garrett & Dunner

[57] ABSTRACT

Apparatus for dividing a continuous sausage skein coming from a stuffing machine into individual sausages in which the rotating displacement elements for dividing the skein consist of a wire strap bent into a V-shaped contour.

8 Claims, 4 Drawing Sheets

APPARATUS FOR SEPARATING A CONTINUOUS SAUSAGE SKEIN COMING FROM A STUFFING MACHINE INTO INDIVIDUAL SAUSAGES

BACKGROUND OF THE INVENTION

This invention relates to an apparatus for dividing a continuous sausage skein coming from a stuffing machine into individual sausages consisting of a device for dividing the skein into individual sausages for rotating the sausage skein, a separating device and a conveyor device for the further transport of the divided sausages, the separating device comprising at least two driven displacement elements rotating in opposite directions about one driving axis each, each of which is designed as a V-shape, said displacement elements being disposed obliquely in opposite direction and interlock staggeredly with the V-cutouts during the separating process.

Displacement elements affixed to two conveying rollers as ribs for dividing a sausage skin into individual sausages are known from the apparatus of (GDR-PS 247 829), the displacement ribs sparing a relatively large passage both in an axial and in a radial direction when engaged so that a considerable amount of sausage meat remains in the sausage skin at the constriction point, which is lost. The two conveyor rollers supporting the displacement elements have a joint drive with the conveyor device so that sausages of a specific length can only be produced.

The invention is based on the technical problem of improving such a device to avoid such losses at the points of the constrictions.

SUMMARY OF THE INVENTION

To solve this technical problem the invention provides in such an apparatus a displacement element consisting of a wire strap, which is bent into a V-shape contour, with this construction the wire strap displacement elements do not interfere with each other during staggered interlocking and a much narrower constriction of the sausage skin is achieved so that there is not longer any sausage meat at the constriction point, thereby avoiding losses of the meat to a great extent. Particularly in the case of sensitive sausage coverings, a much higher portioning performance can moreover be achieved.

The displacement elements rotate about driving axes which are disposed transverse to the direction of transport of the sausage skein, and form a unit of their own with a drive of their own, whose speed can be controlled by an electronic control unit during rotation. Thus longer or also shorter sausages can be formed depending upon the rotational speed of the displacement elements and without any losses of sausage meat at the constrictions.

An optimum interlocking of the wire step displacement elements is achieved by the fact that each V-shaped wire strap is bent at right angles in the area of the V-root so that the V-legs are disposed in adjacent, approximately parallel planes extending approximately the distance of the wire diameter.

The wire which consists e.g. of a nickel chromium steel may have a diameter of about 2 mm. Thus it is relatively thin so that the wire strap displacement elements can be very close to each other. Further features and advantages of the invention will be apparent from the following description in connection with the drawings in which an example of an embodiment of the apparatus is represented.

DETAILED DESCRIPTION OF THE INVENTION

Figure 1:
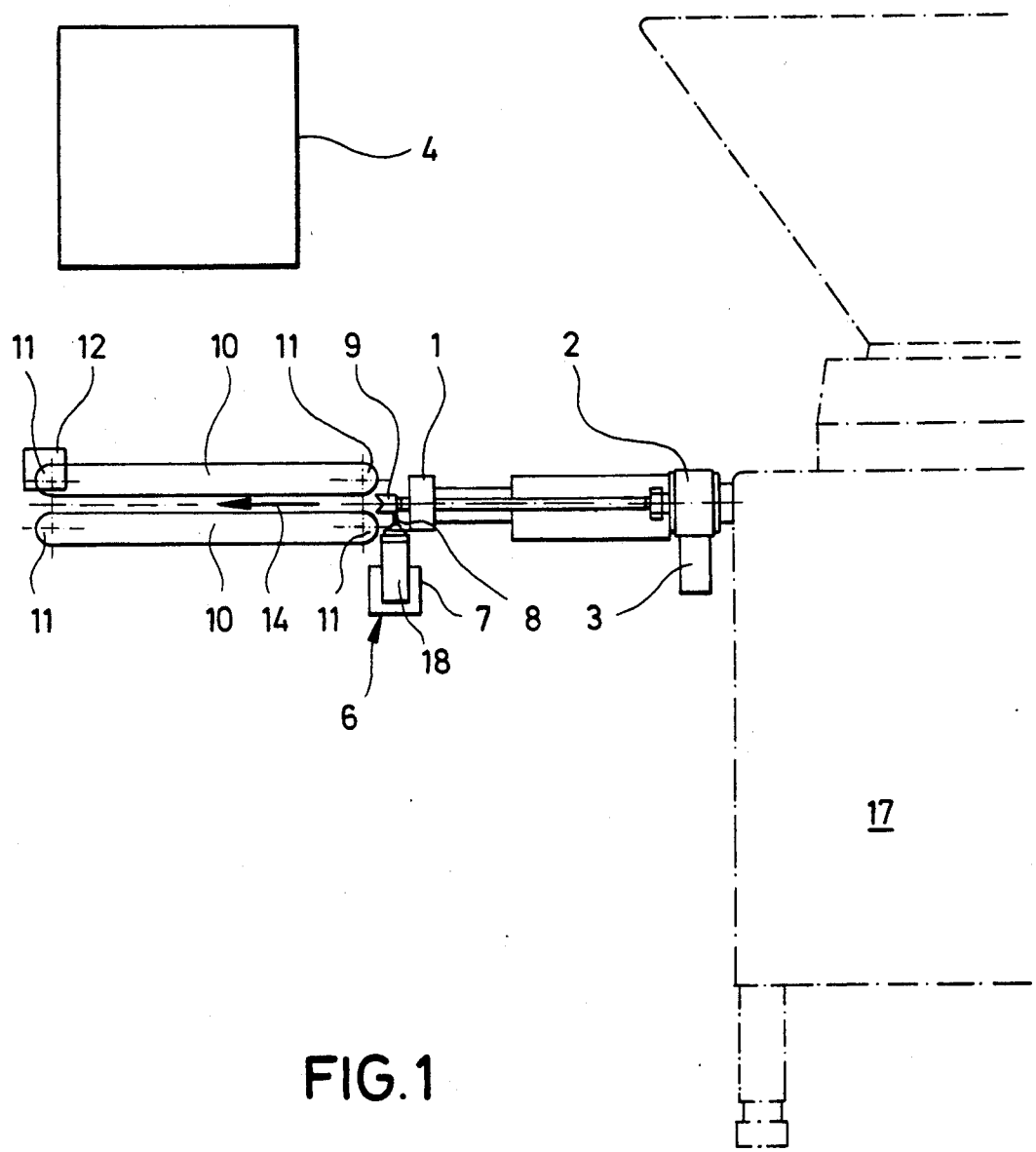
FIG. 1 is a schematic side view of the apparatus of the invention.

The stuffing machine designated 17 is represented in dash-dotted lines in FIG. 1, from which the sausage stuffing material is continuously discharged in skein shape and stuffed into the skin in a customary fashion. The sausage skein created in this fashion is conveyed through the centric opening of a brake ring 1, which is rotated by a twist-off means 2 that also rotates the sausage skein.

The twist-off means 2 is driven by an electric motor 3, the speed of which is controlled by an electronic control unit 4.

The sausage skein next comes to a separating device, which divides the skein into individual but connected sausages, directly behind the brake ring 1, which consists of a displacement unit 6. This displacement unit 6 includes an electric motor 7, which is assembled together with a transmission 18 having two driving shafts 8. (See FIG. 2)

The speed of the electric motor 7 is also controlled by an electronic control unit 4.

A displacement element 9 is slipped on and rigidly connected with each driving shaft 8.

A conveyor device is connected downstream of the separating device, which consists of two endless conveyor belts 10. The conveyor belts 10 are guided around pulleys 11, some of which are connected as drive pulleys with a variable-speed electric motor 12, which, in turn, is controlled by the electronic control unit 4.

The conveyor belts 10 rotate in opposite directions and transport the divided sausages 13 in the direction of the arrow 14.

The two driving shafts 8 for the displacement unit 6 project from the transmission 18 at a distance and in parallel to each other and are driven synchronously and in opposite directions.

Figure 3:
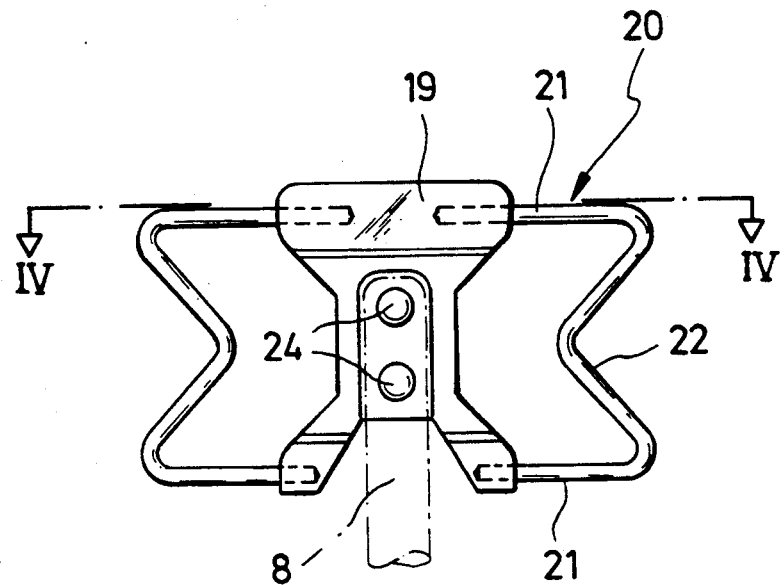
FIG. 3 is a side elevational view of a pair of wire strap displacement elements on a bearing body.
Figure 4:
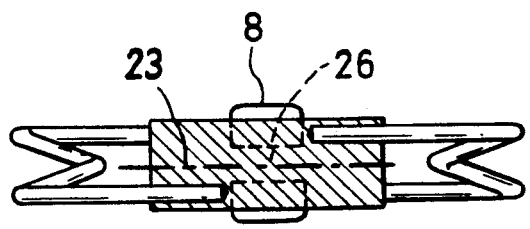
FIG. 4 is a top sectional view taken along the line IV—IV in FIG. 3.

As can be seen from FIGS. 3 and 4, each displacement element 9 is a bent wire strap 20, the wire strap ends 21 extending approximately parallel to each other and being inserted into a bearing body 19 and fixed there e.g. by means of cement. The transverse web 22 of the wire strap 20 is bent in V-shaped fashion in the direction towards the bearing body 19.

The wire strap 20 is made of a deflection resistant wire, e.g. of nickel chromium steel, so that the wire strap does not substantially deform during the constriction of the sausage skein. It has been found that a wire with a diameter of about 2 mm is sufficient depending upon the calibre size of the sausages.

As shown in FIG. 4, the wire strap 20 is attached to the bearing body 19 in oblique fashion. In other words, ends 21 of the wire strap 20 are attached in mutually staggered fashion with respect to the central plane 23 of the bearing body 19. This central plane is drawn in dash-dotted lines in FIG. 4.

The bearing body is fastened to the driving shaft 8 shown in dash-dotted lines in FIG. 3.

For this purpose, the end of the driving shaft 8 is square and is slotted to form a groove so that the end of each driving shaft 8 is in fork-shaped fashion (FIGS. 3 and 4).

The bearing body 19 is milled flat on both opposite sides to form a tongue 26 which slip into the fork-shaped end of the driving shaft 8.

As shown in FIG. 3 the fork-shaped end of the driving shaft 8 is firmly connected to the tongue 26 of the bearing body 19 by means of screws 24.

The bearing body 19 may e.g. be produced by means of injection molding from plastic material.

Figure 5:
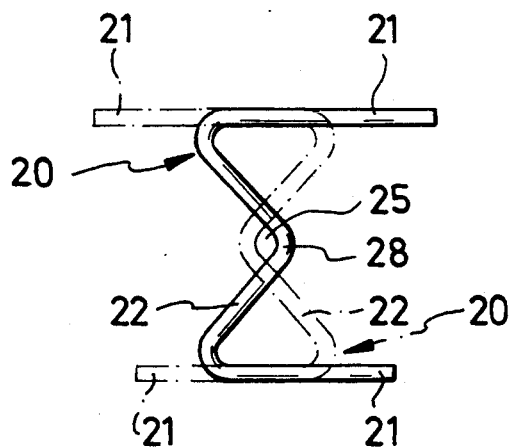
FIG. 5 shows a side view of two wire strap displacement elements in the end condition of interlocking.

In FIG. 5, two cooperating wire straps 20 are shown as displacement elements in the end position of dividing or constricting of the skein.

For the sake of better clarity one of the wire straps is drawn with dash-dotted lines.

In this position the cooperating wire straps 20 only leave only a very small passage 25 at their point of intersection. The wire straps interlock staggeredly and contact each other in the area of their V-roots. The passage is only that large so that the sausage skin pressed together during constricting can be still accommodated there.

Figure 7:
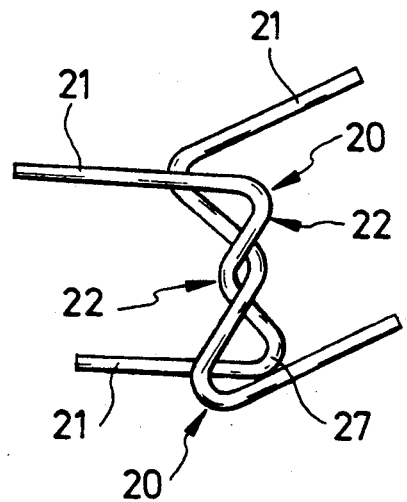

Two cooperating wire straps 20 are shown in a position in FIG. 7 before they have adopted the end condition of interlocking during constricting.

It is evident that the lower bend 27 of the transverse web 22 of the one wire strap pushes through the plane of the other wire strap so that the two wire straps 20 do not interfere with each other during this phase of the staggered interlocking.

Figure 6:
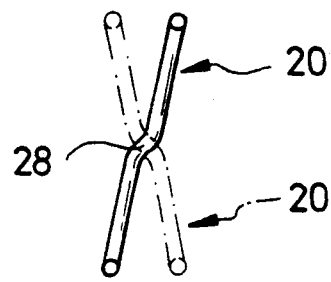
FIG. 6 shows a front view of two interlocking wire strap displacement elements and FIG. 7 shows a perspective view of two wire strap displacement elements before the end condition of interlocking.

As seen in FIG. 6, each wire straps 20 is preferably bent at right angles in the area of the V-root 28 in such fashion so that the V-legs of each individual wire strap 20 are disposed in adjacent, approximately parallel planes extending approximately the distance of the wire diameter.

For the sake of better clarity one of the two interlocking wire straps is drawn in dash-dotted lines in FIG. 6.

Each bearing body 19 may be provided with a single wire strap 20.

However, in the example according to FIG. 3 the bearing body 19 supports two oppositely disposed wire straps 20 so that two dividing processes can be carried out upon each full rotation of the bearing body about the driving shaft 8.

Figure 2:
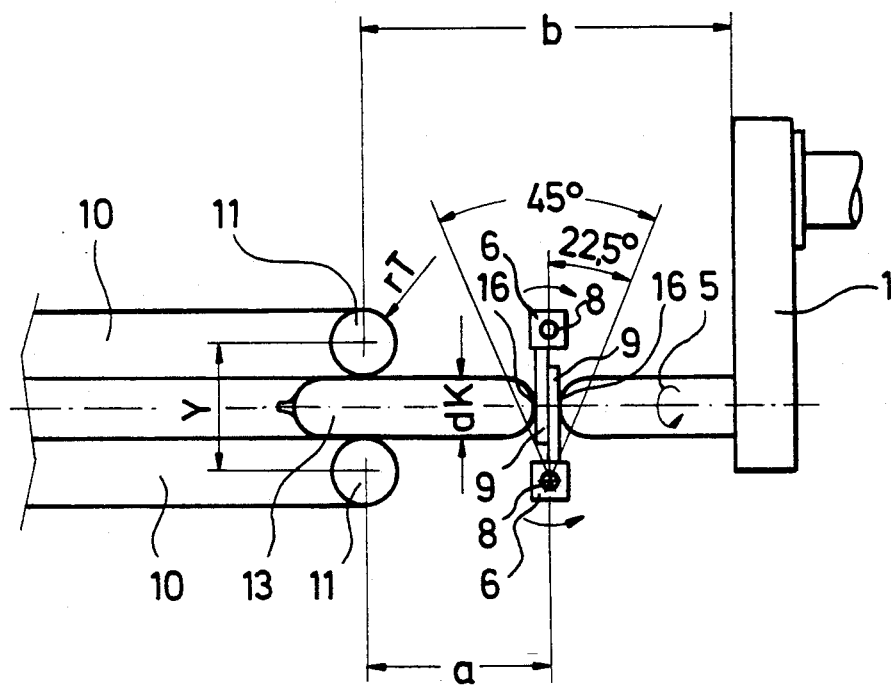
FIG. 2 is a top plan view of the apparatus with the endless belts being rotated 90° for the sake of clarity.

The apparatus operates as follows:

With reference to FIG. 2, the sausage skein 5 coming from the stuffing machine is caused to rotate by the brake ring 1 which is driven via the transmission 2 by the electric motor 3 in the direction of the arrow.

The displacement elements 9 rotating synchronously and in opposite directions (as shown in FIG. 2 by the arrows) make contact with the rotating sausage skein 5 at an angle of approximately 45° depending upon the calibre of the skein.

While the displacement elements 9 are in engagement with the sausage skein 5, their speed is controlled so that the rotary speed of their point of intersection at the point they turn (passage 25 for the sausage skin) corresponds substantially to the forward speed of the sausage skein 5, which is controlled by the speed of the endless belts 10.

The sausage skein 5 rotates during its constriction by the displacement elements 9 until the front end of the sausage 13, already twisted off, is grasped by the endless belts 10 and a further constriction is carried out with the succeeding portion. Since the rear sausage skein continues to rotate, a twisting off of the rear end 16 of the sausage takes place.

If the displacement elements 9 rotate at a constant speed, sausages of a specific length are produced, each of which has a specific portion size of constant calibre.

If sausages with a greater length are to be produced, the electronic control unit 4 control the rotary speed of the displacement elements 9 so that they rotate more slowly when they out of engagement with the sausage skein 5 i.e. in their functionless phase.

In order to be able to produce sausages of a very great length, the rotary speed of the displacement elements can be controlled up to zero during the functionless phase so that they stand still for a specific period of time. In order to nevertheless make a safe separating possible, the brake ring 1 is finally shut down so that the sausage skein 5 does not rotate and can therefore enter between the endless belts 10 without disturbance. Only when the displacement elements 9 constrict and then divide the sausage skein 5, will the brake ring 1 be caused to rotate to twist off the rear ends of the sausage.

If the rotary speed of the displacement elements 9 is increased during their functionless phase, shorter sausages are obtained. The smallest possible portion length depends on the distance a in FIG. 2 as a function of the radius rT of the pulleys 11 and the length of the displacement elements 9.

If sausages of a very large calibre dk are to be produced, the displacement elements can be removed by pulling bearing bodies 19 of from the driving shafts 8 and replacing them with larger strap-shaped displacement elements. The brake ring must also be replaced by a larger one. The distance Y of the endless belts 10 must moreover be increased in a known manner. The displacement unit must then of course be designed in such a way that the distance between driving shafts 8 can also be correspondingly increased.

Not only sausages made from sausage meat can be produced with the apparatus, but also such from other pasty compositions.

I claim:

1. Apparatus for diving a continuous sausage skein exiting from a stuffing machine into individual sausages comprising twisting means for rotating the sausage skein, a separating device for dividing the skein into individual sausages and a conveyor means located downstream of the separating device for conveying the thus divided sausages away from the separating device, said separating device comprising at least two displacement elements mounted for rotation in opposite directions on either side of said skein and adapted to be brought into closely spaced position relative to one another to periodically engage and thereby constrict and divide said sausage skein into individual sausages and means for rotating said elements, each of said elements having a skein engaging portion comprising a wire strap bent into a V-shaped contour and being disposed obliquely in opposite directions relative to one another as they engage the skein so that the V-shaped portions thereof staggeredly interlock as they constrict the sausage skein.

2. The apparatus of claim 1, wherein each V-shaped wire strap has a V-root portion and two leg portions, said strap being bent at right angles in the area of the V-root of the strap so that the legs thereof are disposed in adjacent, approximately parallel planes extending approximately at the distance of the diameter of the wire.

3. The apparatus of claim 1 or 2, wherein the wire strap has a diameter of about 2 mm.

4. The apparatus of claim 1, wherein each displacement element includes a bearing body mounted on a drive shaft, the ends of said wire straps being secured in said body.

5. The apparatus of claim 4, wherein the bearing body consists of a plastic material.

6. The apparatus of claim 4, wherein the bearing body is mounted on the drive shaft in a groove and tongue engagement, the groove and tongue extending in the axial direction of the drive shaft.

7. The apparatus of claim 4, include two V-shaped wire straps secured on opposite sides of each of said bearing bodies.

8. The apparatus of claim 1, including control means for varying the rotational speed of the displacement elements between the time they are engaged with the continuously moving skein and the time they are disengaged therefrom to thereby vary the length of said divided sausages.

* * * * *